United States Patent
Lilja

[19]

[11] Patent Number: 6,163,690
[45] Date of Patent: Dec. 19, 2000

[54] COMMUNICATIONS ACCESSORY WITH IMPROVED VEHICLE IGNITION SENSE

[75] Inventor: Patrik Lilja, Cary, N.C.

[73] Assignee: Ericsson Inc., Research Triangle Park, N.C.

[21] Appl. No.: 09/243,986

[22] Filed: Feb. 4, 1999

[51] Int. Cl.[7] ................................................ H04B 1/16
[52] U.S. Cl. .................... 455/343; 455/557; 455/574; 455/127
[58] Field of Search .................... 455/572, 571, 455/575, 574, 557, 343, 127

[56] References Cited

U.S. PATENT DOCUMENTS

| | | | |
|---|---|---|---|
| 4,860,005 | 8/1989 | DeLuca et al. | 340/825.44 |
| 4,974,250 | 11/1990 | Tomiyori | 455/557 |
| 5,212,836 | 5/1993 | Matsushita | 455/343 |
| 5,444,306 | 8/1995 | Sawa et al. | 307/9.1 |
| 5,790,961 | 8/1998 | Ingram et al. | 455/574 |
| 5,819,170 | 10/1998 | Norimatsu | 455/343 |
| 5,959,545 | 9/1999 | Lhamon | 340/825.44 |
| 5,995,813 | 11/1999 | Ishikura et al. | 455/127 |

Primary Examiner—Fan Tsang
Assistant Examiner—Blane J. Jackson
Attorney, Agent, or Firm—Coats & Bennett, PLLC

[57] ABSTRACT

A method and apparatus for managing power consumption of a communications accessory attached to a vehicle based on the state of vehicle's ignition and upon the power on/off history of the wireless communications device attached to the communications accessory. The method determines whether the last powering off of the wireless communications device was due to user action. If so, then the wireless communications device is left in a powered off state when the ignition is turned back on. If, instead, the last powering off of the wireless communications device was in response to an automatically generated request from the communications accessory (prompted by the ignition being turned off), the wireless communications device is powered back on when the ignition is turned back on. An ignition sense circuit determines the power state of the vehicle's ignition and tracks the recent power on/off history of the wireless communications device. Based on information from the ignition sense circuit, power control logic automatically turns the wireless communications device back on according to the method when the vehicle's ignition is turned back on. In addition, the correctness of the ignition sense line installation may be checked via a combination of a status flag and a suitable timer. If the timer expires, the status flag is set to indicate an improper installation of the ignition sense line.

17 Claims, 9 Drawing Sheets

COMMUNICATIONS ACCESSORY WITH IMPROVED VEHICLE IGNITION SENSE

FIELD OF THE INVENTION

The present invention relates to the field of vehicle communications accessories and, more particularly, to a method of managing power flow through a vehicle accessory depending upon the state of the vehicle's ignition.

BACKGROUND OF THE INVENTION

Communications accessories, such as hands-free adapters, and the like, are typically deployed so as to act as an interface between a wireless communications device, such as a cellular telephone, and a vehicle's electrical system. Such accessories typically draw power from the vehicle's electrical system and supply power to the wireless communications device for charging, etc. When the vehicle is operating, the electrical load on the vehicle from the accessory and wireless communications device is relatively small compared to the overall electrical demands from the vehicle itself. However, when the vehicle is not operating, the accessory needs to consume as little power as possible so as to not drain the vehicle's battery. According to industrial standards for vehicles, the maximum allowed current consumption when the vehicle is not operating is typically one milliamp.

In the prior art, an ignition sense functionality had been developed which was used to determine whether the vehicle's ignition was on or off. Typically, this ignition sense functionality was accomplished by monitoring a switched power line of the vehicle. This ignition sense was then used to turn on or off the communications accessory in a binary fashion. That is, when the vehicle was on, the communications accessory would be on; but when the vehicle's ignition was off, the communications accessory would be powered off. Typically, a wireless communications device connected to the communications accessory had the same power on/off state as the communications accessory, meaning, for instance, that when the communications accessory was turned on, the wireless communications device was likewise turned on and when the accessory was turned off, the wireless communications device was turned off.

The user might, however, not always want the wireless communications device to power on when the vehicle ignition is turned on. For instance, if the user has physically powered the wireless communications device off, the user may not want to receive calls until the user intervenes to turn the wireless communications device on. However, under the prior art, the wireless communications device would be automatically powered on when the vehicle was turned on.

Further, it was possible that the installer of the ignition sense line might inadvertently connect the ignition sense to a line which was connected to continuous power (directly to the vehicle's battery). In such a situation, the accessory and wireless communications device will believe that the ignition is always on and will undesirably drain the vehicle's battery.

Still further, some communications accessories may have additional functionality, such as background noise adaptation capability, that should be ready for instant cooperation with the wireless communications device. That is, the communications accessory may have functions that take time to properly prepare for operation, but that should be essentially instantaneously ready for use when a wireless communications device is mated to the communications accessory, if the associated vehicle is turned on. Because such functions will most likely require the use of power, the ability of the communications accessory to properly determine the state of the vehicle's ignition will allow for more prudent power management associated with the operation of these functions.

Accordingly, there remains a need for a communications accessory that has a power management scheme wherein the power consumption of the communications accessory, both internally and through the communications accessory, is based not only on the state of the vehicle ignition, but also to the history of the wireless communications device attached to the communications accessory. Further, there is a separate need for a method for a communications accessory to determine whether the ignition sense line has been correctly installed.

SUMMARY OF THE INVENTION

The present invention provides a method and apparatus for managing the power consumption of a communications accessory attached to a vehicle based on the state of vehicle's ignition and upon the power on/off history of the wireless communications device attached to the communications accessory. The method determines whether the last powering off of the wireless communications device was due to user action, such as pressing the on/off switch on the wireless communications device. If so, then the wireless communications device is left in a powered off state when the ignition is turned back on (after being previously powered off). If instead, the last powering off of the wireless communications device was in response to an automatically generated request from the communications accessory (prompted by, inter alia, the ignition being turned off), the wireless communications device is powered back on when the ignition is turned back on. For some preferred embodiments, suitable timers and status checks are employed to make the transition of the wireless communications device to a powered off state be more user friendly.

The apparatus of the present invention includes an ignition sense circuit that, if the ignition sense line is installed, determines the power state of the vehicle's ignition and tracks the recent power on/off history of the wireless communications device. The ignition sense circuit works with power control logic to control the power state of the wireless communications device when the vehicle's ignition is turned back on. Based on information from the ignition sense circuit, the power control logic automatically turns the wireless communications device back on if the last powering down of the wireless communications device was caused by the power control logic. If, instead, the last powering down of the wireless communications device was a result of user action, the power control logic leaves the wireless communications device powered off. In this manner, the user's selection of on/off state for the wireless communications device is given priority while still providing useful power management so as to not unduly drain the vehicle's battery.

Separately, or in combination with the above, the correctness of the ignition sense line installation may be checked by the present invention. To do so, a status flag is first set to a default indication that that the ignition sense line is not installed. Thereafter, when a first signal is detected on the ignition sense line, such as an indication that the ignition is being turned on, the status flag is changed to indicate a proper installation of the ignition sense line and a timer is set. If a second signal is detected on the ignition sense line, such as an indication that the ignition is being turned off, the timer is disabled. If the timer expires, the status flag is set to indicate an improper installation of the ignition sense line.

DETAILED DESCRIPTION

Figure 1:
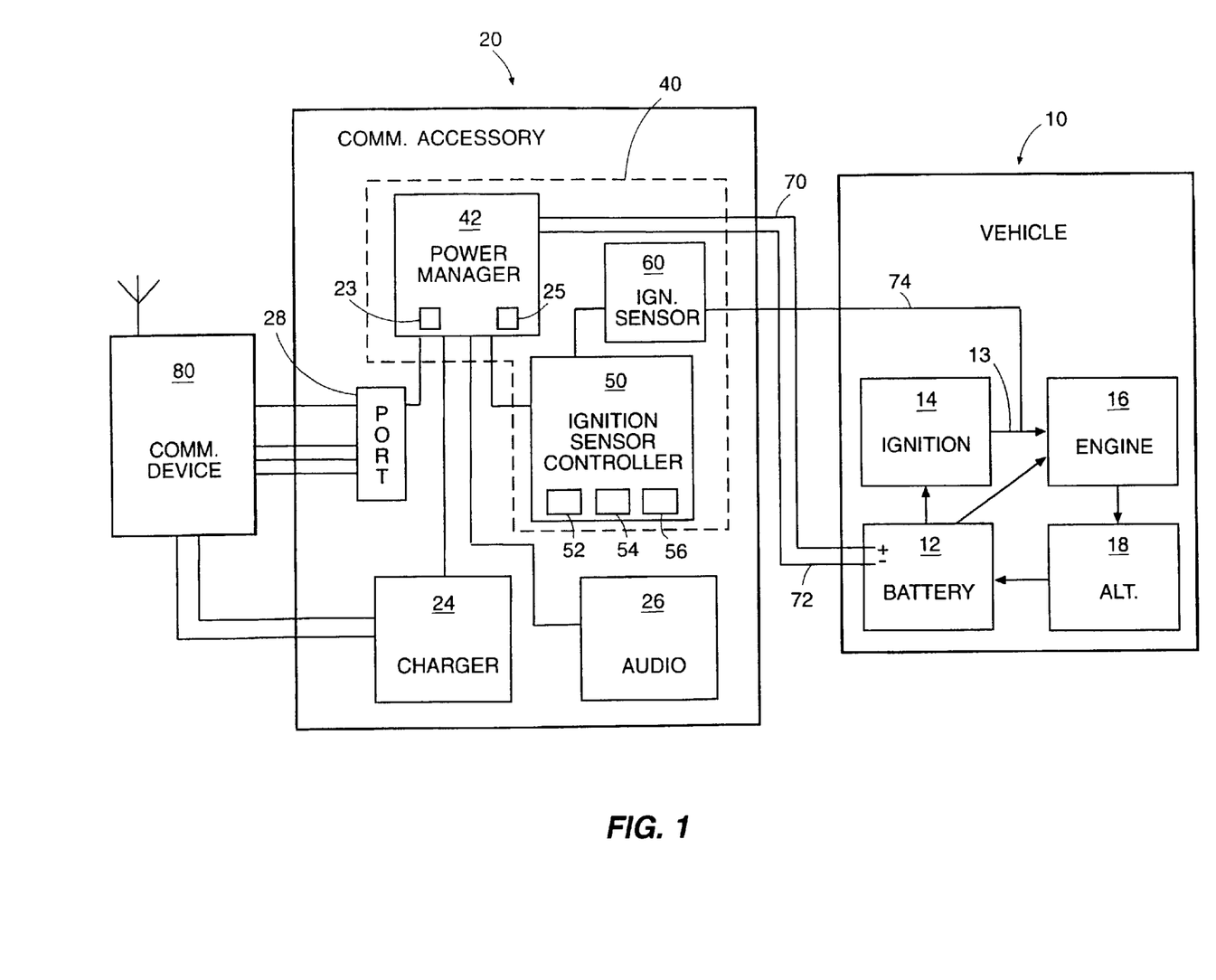
FIG. 1 is a simplified block diagram of a communications accessory of the present invention hooked to a vehicle and a wireless communications device.

A communications accessory 20 employing the present invention utilizes a multi-state power management scheme to control its power and the powered state of an attached wireless communications device 80. The power management scheme looks to the state of the vehicle 10 and the history of the accompanying wireless communications device 80 to determine what actions should be taken. Thus, as contrasted with a prior art schemes looking only to the vehicle's state, the power management method of the present invention is dependent upon both the ignition state of the vehicle 10 and the history of the associated wireless communications device 80.

A cellular telephone will be used as an illustrative example of the wireless communications device 80; however, the present invention is not so limited and, instead, functions with any wireless communications device 80, such as a cellular telephone, a personal digital assistant, a pager, and the like Further, a hands-free adapter with an incorporated battery charger will be used as an illustrative example of the communications accessory 20, but it is to be understood that the present invention is suitable for a wide variety of communications accessories 20, including hands-free adapters, battery chargers, position locators, and the like designed for use with vehicles.

The present invention is use d in a vehicle environment. T he communications accessory 20 is disposed between the vehicle 10 and the phone 80 and communicates and/or monitors the actions of both. See FIG. 1. Of course, the phone 80 is removable from the communications accessory 20, but the communications accessory 20 is assumed to be relatively permanently attached to the vehicle 10 once installed.

For purposes of understanding the present invention, the vehicle 10 includes a battery 12, an ignition 14, an engine 16, and an alternator 18. The battery 12 stores electrical energy and provides the same to start and run the engine 16 and to power any vehicle accessories. The ignition 14 causes the engine 16 to start and stop and is typically controlled by the user via a multi-position keyswitch. For purposes of illustrating this invention, the ignition 14 will be considered "off" when the keyswitch is in the off and start positions, and "on" in all other positions (typically run and accessory). The engine 16 provides power to the vehicle 10 typically through an internal combustion process. The alternator 18 converts mechanical power from the engine 16 to electrical power for use by the battery 12 and/or other parts of the engine 16. For the present invention, the particular details of the configuration and operation of these parts are unimportant except to understand that the vehicle 10 functions as a power source to the communications accessory 20, and to the phone 80 via the communications accessory 20, that can be turned on or off via the ignition 14.

The communications accessory 20 of the present invention is electrically disposed between the vehicle 10 and the phone 80 when the phone 80 is connected to the communications accessory 20. The communications accessory 20 typically includes a power management circuit 40, a charging circuit 24, an audio sub-system 26, and a phone interface port 28 and typically has three modes: off, sleep, and active. In the off mode, the communications accessory 20 is not receiving power from the vehicle 10. In the active mode, the communications accessory 20 is drawing power from the vehicle 10 and the internal components of the communications accessory 20 are typically fully powered. In the sleep mode, the communications accessory 20 is drawing a limited amount of power from the vehicle 10, but most of the internal components of the communications accessory 20 are either powered down or in a very low power mode.

The power management circuit 40 is a logic circuit that at least partially controls the overall operation of the communications accessory 20 by controlling the power within the communications accessory 20 and the power flowing to the phone 80 through the communications accessory 20. For instance, the power management circuit 40 may function to power down the various portions of the communications accessory 20 at selected times, such as by powering down the audio sub-system 26 when the phone 80 is not actively involved in a call and the ignition 14 is turned off. The power management circuit 40 typically includes a power manager 42, an ignition sense controller 50 and an ignition sensor 60. The power manager 42, and the ignition sense controller 50, are typically located in a microprocessor which sends commands to the other portions of the communications accessory 20 and maintains various status flags. The power management circuit 40 communicates with the communications device 80 through the interface port 28, and with various other portions of the communications accessory 20, such as the charging circuit 24, audio sub-system 26, etc. The microprocessor of the power management circuit 40 preferably includes an operational sleep mode wherein the very low power is consumed. In this sleep mode, the microprocessor preferably monitors for interrupts, such as the IGNIT_STAT(ON) and PHONE STAT(ON) interrupts described below, generated by other portions of the power management circuit 40, and assumes a normal awake mode upon detection of such interrupts. Conversely, the microprocessor should preferably enter the operational sleep mode when the other portions of the communications accessory 20, and the phone 80 if connected, are powered down. For purposes of understanding the present invention, the particular details of the operation of the power manager 42 are unimportant and any known logic for the power manager 40 may be used, except as described below. Further, the power manager 42 includes, or communicates with, suitable common registers for various status flags 23,25.

The charging circuit 24 operates to convert power from the vehicle 10 to a type suitable for charging the battery associated with the phone 80 in a manner well known in the art. The audio sub-system 28 operates to control a speaker and microphone associated with the communications accessory 20 so as to generate and detect audible sounds in a manner well known in the art. The phone interface port 28 allows communication between various parts of the communications accessory 20 and the phone 80, including the exchange of command and status information.

The ignition sensor 60 monitors the ignition sense line 74 for indications that the vehicle's ignition 14 has been turned on or off as described below. The ignition sense controller 50 monitors the current status of the vehicle's ignition 14 and tracks the present and past history of the phone 80 so as to update the relevant status information for the power manager 42. In addition, the ignition sense controller 50 also communicates with the phone, typically via the interface port 28, to send power-on and power-off commands. The ignition sense controller 50 may be any suitable logic circuit, for example a state machine, and may be a portion of the power manager 42 or may be a separate module. The ignition sense controller 50 communicates with the power manager 42, with the phone 80 via the interface port 28, and with the ignition sensor 60. The ignition sense controller 50 preferably includes three timers, an install timer 52, a safety timer 54, and an Ignition sense timer (IS timer) 56. The install timer 52 and the safety timer 54 are typically designed for long periods of time, on the order of one or more hours. The IS timer 56 is typically designed for shorter periods of time, such as less than five minutes. These timers may be of any hardware or software type known in the art.

The remaining details of the configuration, construction, and operation of the communications accessory 20 are well known in the art and further explanation thereof, except as given below, is not necessary for understanding the present invention.

The communications accessory 20 is typically electrically connected to the vehicle 10 by three lines. Two direct power lines 70,72 connect the communications accessory 20 to the battery 12 via the vehicle's main electrical system. These lines are typically referred to as positive 70 and ground 72 lines and are typically unswitched by the vehicle 10, meaning that the communications accessory 20 may form a circuit with them and pull power from the battery 12 at the discretion of the communications accessory 20. In addition, the power management circuit 40 is preferably connected to the vehicle by an ignition sense line 74. This ignition sense line 74 is preferably connected to some switched line 13 in the vehicle 10 such that the switched line 13 is inactive when the vehicle's ignition 14 is not on. However, as described below, the present invention also functions to determine when the ignition sense line 74 is either not installed or incorrectly installed. Thus, the ignition sense line 74 is not always connected to a switched line 13 in the vehicle.

Figure 2:
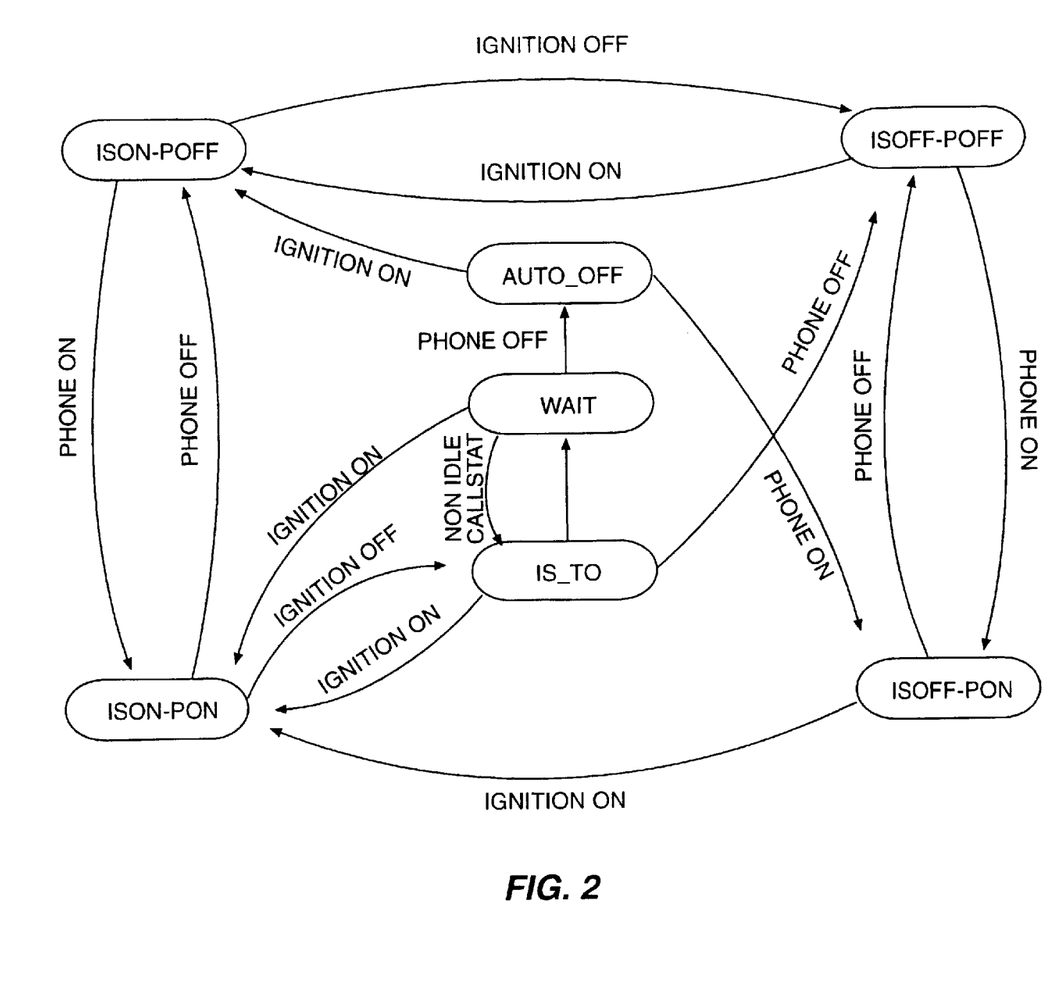
FIG. 2 is an overall state diagram of the power management scheme.

The ignition sense controller 50 controls the operation of the communications accessory 20. In the disclosed embodiment, the ignition sense controller 50 has seven states: ISOFF_POFF; ISOFF_PON; ISON_PON; ISON_POFF; IS_TO; WAIT, and AUTO_OFF. This logic scheme is shown in FIG. 2.

At the first initialization, the vehicle ignition sense status flag (VISS) 23 is set to a default of NOT_INSTALLED, and the call status flag (CALLSTAT) 25 is set to a default of IDLE. The VISS flag 23 is intended to be an indicator of the status of the installation of the ignition sense line 74. The VISS flag 23 has three settings, INSTALLED_OK for a good installation, INSTALL_ERR for an installation error, and NOT_INSTALLED for an indication that the ignition sense line 74 is not installed. The CALLSTAT flag 25 is intended to indicate the status of an active phone 80 and may be any number of states, such as idle, calling, connecting, active, hold, waiting, alerting, busy, etc. For purposes of this invention, these states may be grouped into two classes, IDLE and ACTIVE. The IDLE class includes the idle state; the ACTIVE class includes all other states of the active phone 80. Of course, a powered off phone 80 will have no active state.

Figure 3:
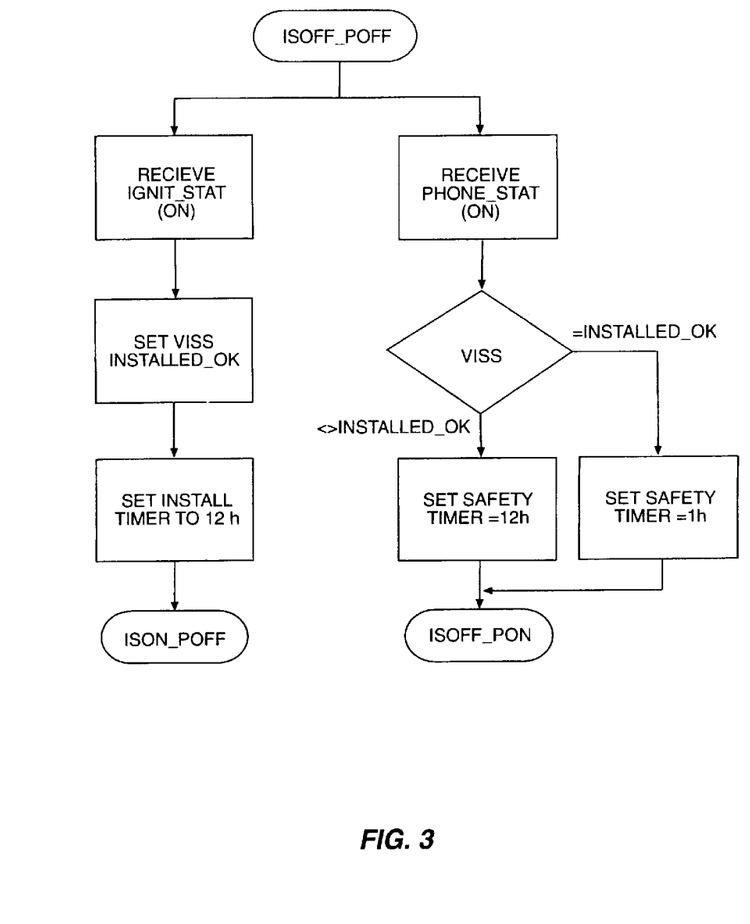
FIG. 3 is an simplified flow diagram of the ISOFF_POFF state.

Upon first being installed, the ignition sense controller 50 enters the ISOFF_POFF state, which is shown in more detail in FIG. 3. In this state, both the phone 80 and the ignition 14 are off. Upon entering the ISOFF_POFF state, the power management circuit 40 should be asleep, but monitoring for either the ignition 14 or the phone 80 being turned on. For instance, the power management circuit 40 could monitor the interface port 28 and check for timeouts. If there are timeouts on the interface port 28, the power management circuit 40 may assume that the phone 80 is off. Otherwise, the phone 80 may be assumed to be on. A similar sleepy detection approach may be done with the ignition sense line 74. Upon receipt of an indication that either the phone 80 has been turned on (PHONE_STAT(ON) interrupt) or the ignition 14 has been turned on (IGNIT_STAT(ON) interrupt), the microprocessor of the power management circuit 40 will awaken. When the microprocessor of the power management circuit 40 is awake, the power draw from the vehicle 10 will be higher, such as well above one milliamp.

For the typical embodiment being discussed, the ignition sense controller 50 is operational when the microprocessor of the power management circuit 40 is awake. The ignition sense controller 50, in the ISOFF_POFF state, checks for either an IGNIT_STAT(ON) or a PHONE_STAT(ON) interrupt. The IGNIT_STAT(ON) interrupt is generated by the ignition sensor 60 and occurs when a signal is detected on the ignition sense line 74. The PHONE_STAT(ON) interrupt occurs when a communications channel is established between the phone 80 and a remote device.

Upon notice of an IGNIT_STAT(ON) interrupt in the ISOFF_POFF state, the ignition sense controller 50 sets the VISS flag 23 to INSTALLED_OK to indicate that at least some signal has been received on the ignition sense line 74, sets the install timer 52 to a long period such as twelve hours, and enters the ISON_POFF state. For reference, the install timer 52 is intended to assist in determining whether the ignition sense line 74 is properly installed. If the install timer 52 expires, then this is an indication that the ignition sense line 74, while installed, is not installed properly.

Alternatively, upon notice of the PHONE_STAT(ON) interrupt in the ISOFF_POFF state, the VISS flag 23 is checked. If the VISS flag 23 is not equal to INSTALLED_OK, the safety timer 54 is set to a long period, such as twelve hours. If the VISS flag 23 is INSTALLED_OK, the safety timer 54 is set to a shorter period, such as one hour. For reference, the safety timer 54 is optionally provided to help insure that the vehicle battery 12 is not unduly drained. Upon expiration of the safety timer 54, the communications accessory 20 should stop drawing more than one milliamp of power from the vehicle 10. The different setting times of the safety timer 54 are provided so that the phone 80 is less likely to unexpectedly power down on a user when the ignition sense line 74 is either not installed correctly or not installed at all, but will power down after a shorter period of time to conserve vehicle power when the ignition sense line 74 is installed correctly. After setting the safety timer 54, the ignition sense controller 50 enters the ISOFF_PON state.

Figure 4:
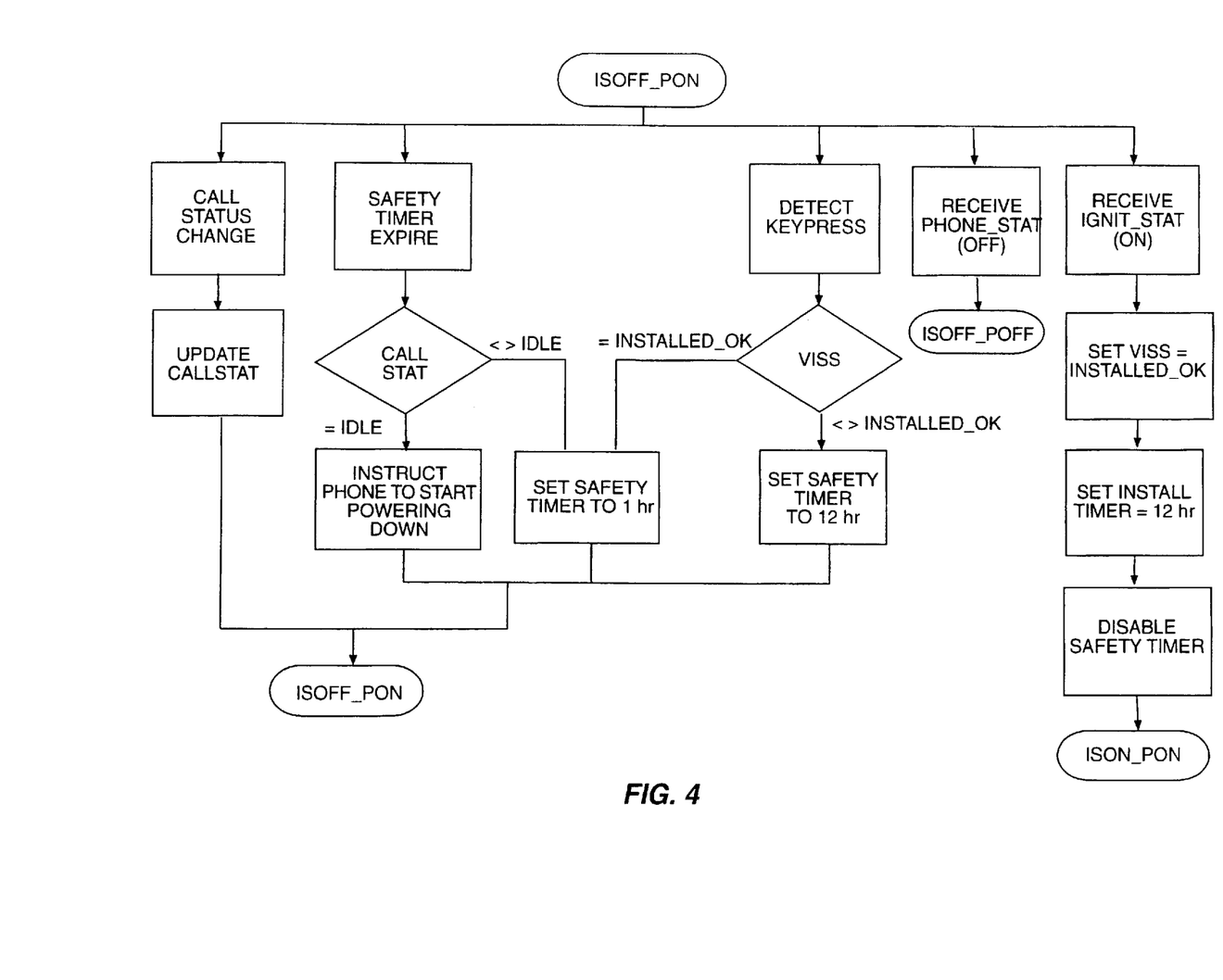
FIG. 4 is an simplified flow diagram of the ISOFF_PON state.

In the ISOFF_PON state, which is shown in more detail in FIG. 4, the ignition 14 is off, but the phone 80 is on. If, while in this state, the ignition sense controller 50 receives an indication of an active phone 80 status, the CALLSTAT flag 25 is updated. If, instead, the safety timer 54 expires, the CALLSTAT flag 25 is checked. If the status is IDLE, the ignition sense controller 50 instructs the phone 80 to begin powering down (turn off); if the status is not IDLE, the safety timer 54 is reinitialized to a suitably distant time, such as one hour. Likewise, if a keypress is noted, the VISS flag 23 is checked and the safety timer 54 is reinitialized to either twelve hours or one hour depending on whether the VISS flag 23 is INSTALLED_OK or not. At the conclusion of the above situations, the ignition sense controller 50 remains in the ISOFF_PON state. The reinitializing of the safety timer 54 helps prevent untimely turning off of the phone 80, and is done in the ISOFF_PON state when there is some indication that the phone 80 is being actively used.

In contrast, if while in the ISOFF_PON state, the PHONE_STAT(OFF) interrupt is received, indicating that the phone 80 has completed a power down, the ignition sense controller 50 returns to the ISOFF_POFF state. It is anticipated that the phone power down in such a situation will be because of user action; specifically, the user will have manually pressed an on/off switch on the phone 80, or otherwise directly indicated to the phone 80 that it should turn off, such as by voice command or similar means. This type of "user action" power off is to be contrasted with the "automatic" powering down of the phone 80 under the direction of the communications accessory 20, as discussed in more detail below. In addition, the communications accessory 20 treats the removal of the phone 80 from the communications accessory 20 as the equivalent to the sending of a PHONE_STAT(OFF) interrupt.

Instead, if while in the ISOFF_PON state, an IGNIT_STAT(ON) interrupt is received, indicating that the vehicle ignition 14 has been turned on, the VISS flag 23 is set to INSTALLED_OK, the install timer 52 is reinitialized to twelve hours, the safety timer 54 is disabled without expiring, and the ignition sense controller 50 enters the ISON_PON state.

Figure 5:
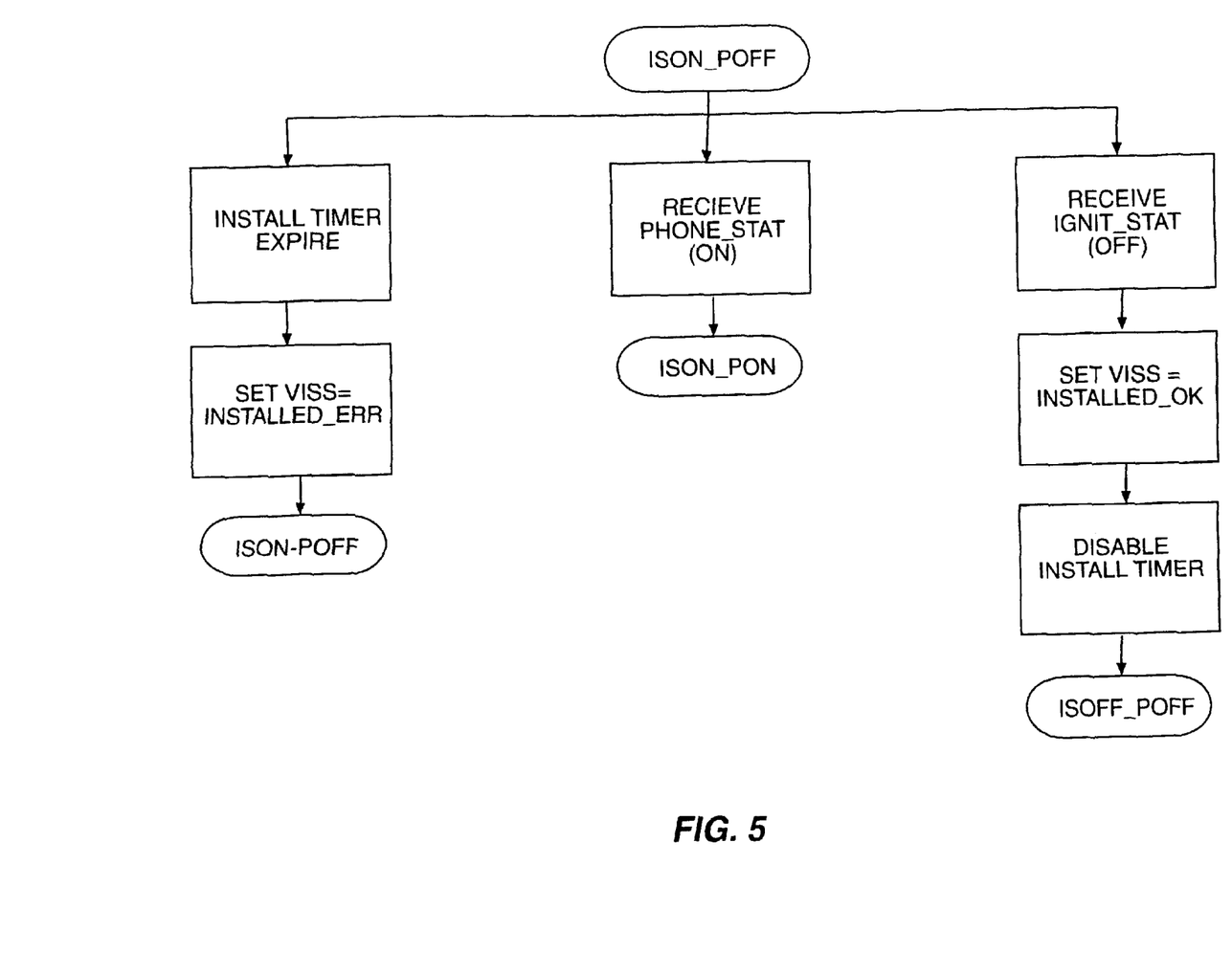
FIG. 5 is an simplified flow diagram of the ISON_POFF state.

In the ISON_POFF state, which is shown in more detail in FIG. 5, the ignition 14 is on, but the phone 80 is off. If, while in this state, the install timer 52 expires, the VISS flag 23 is changed to INSTALLED_ERR and the ignition sense controller 50 remains in the ISON_POFF state. If the ignition sense controller 50 receives an PHONE STAT(ON) interrupt, indicating that the phone 80 has completed a power up, the ignition sense controller 50 goes to the ISON_PON state. If instead, an IGNIT_STAT(OFF) interrupt is received, the VISS flag 23 is set to INSTALLED_OK, the install timer 52 is disabled without expiring, and the ignition sense controller 50 enters the ISOFF_POFF state.

Figure 6:
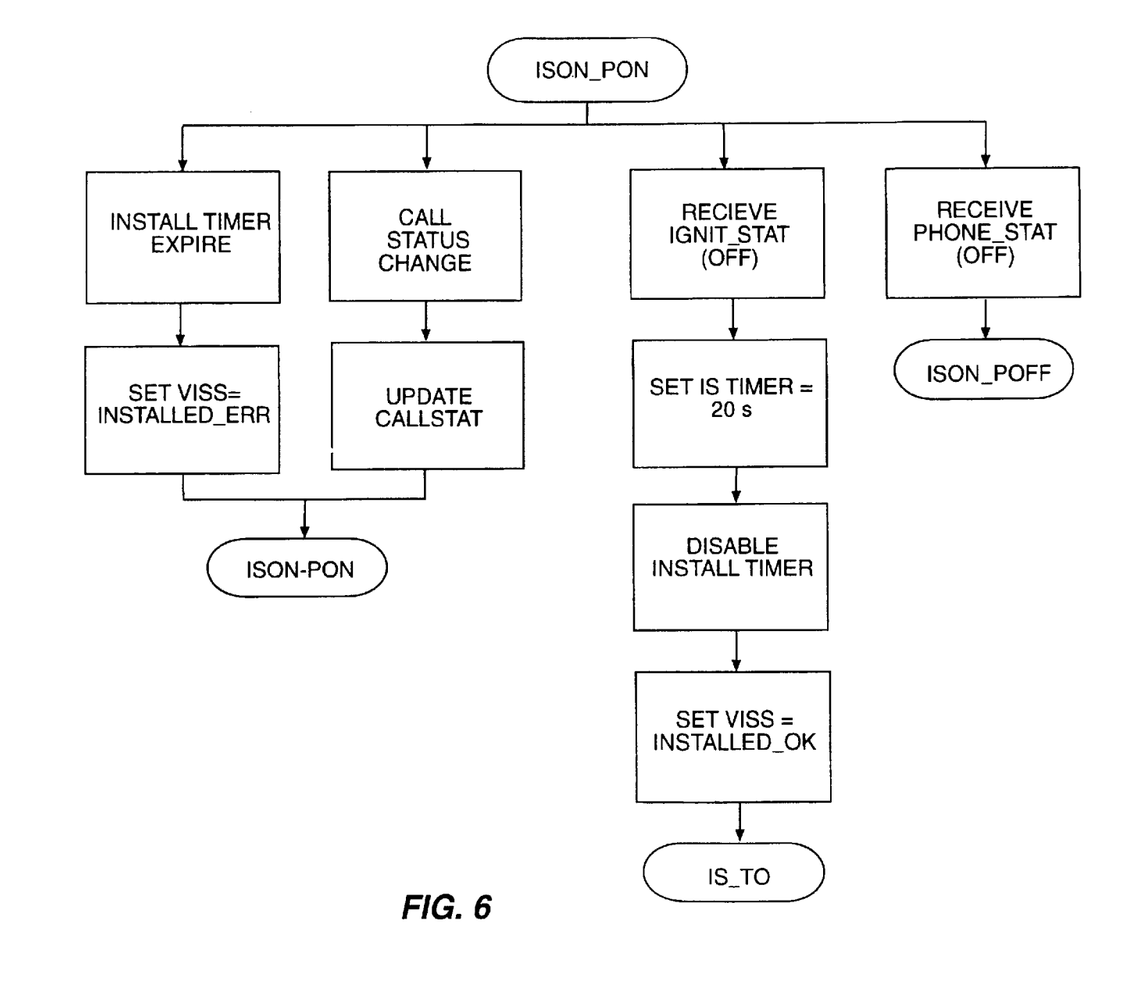
FIG. 6 is an simplified flow diagram of the ISON_PON state.

In the ISON_PON state, which is shown in more detail in FIG. 6, both the ignition 14 and phone 80 are on. If, while in this state, the install timer 52 expires, the VISS flag 23 is changed to INSTALLED_ERR and the ignition sense controller 50 remains in the ISON_PON state. If, instead, the ignition sense controller 50 receives an indication of a call status change, the CALLSTAT flag 25 is updated and the ignition sense controller 50 remains in the ISON_PON state. If the ignition sense controller 50 receives a PHONE_STAT(OFF) interrupt, indicating that the phone 80 has completes a power down, the ignition sense controller 50 enters the ISON_POFF state. If an IGNIT_STAT(OFF) interrupt is received, the VISS flag 23 is set to INSTALLED_OK, the install timer 52 is disabled without expiring, the IS timer 56 is set to a very short period of time, such as twenty seconds, and the ignition sense controller 50 enters the IS_TO state.

Figure 7:
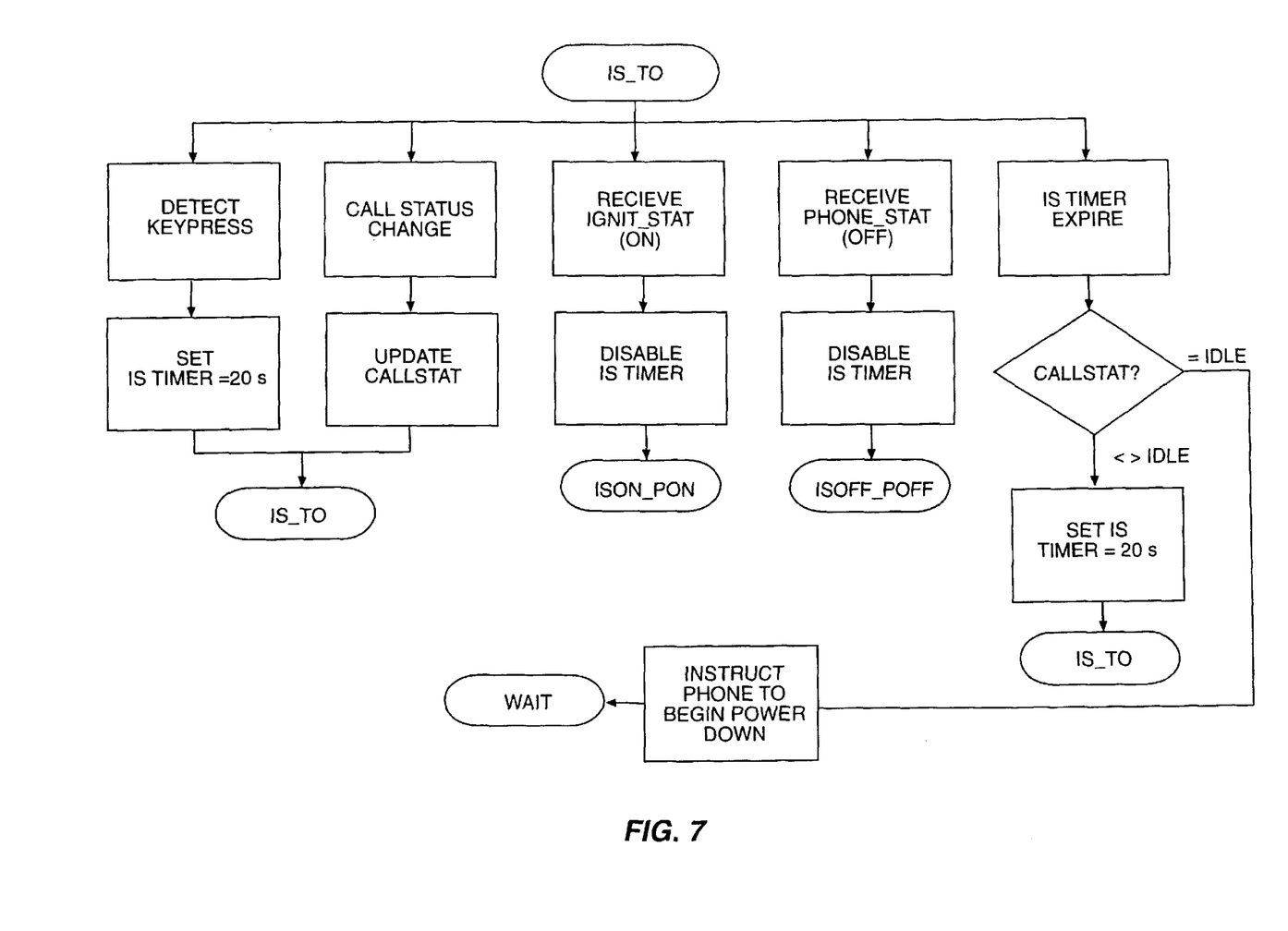
FIG. 7 is an simplified flow diagram of the IS_TO state.

In the IS_TO state, which is shown in more detail in FIG. 7, the ignition 14 is off and the phone 80 is on. If, while in this state, the ignition sense controller 50 receives an indication of an active phone 80 status, the CALLSTAT flag 25 is updated. Likewise, if a keypress is noted, the IS timer 56 is reinitialized to twenty seconds. At the conclusion of the above situations, the ignition sense controller 50 remains in the IS_TO state. If the PHONE_STAT(OFF) interrupt is received, indicating that the phone 80 has completed a power down, the IS timer 56 is disabled without expiring and the ignition sense controller 50 returns to the ISOFF_POFF state. If an IGNIT_STAT(ON) interrupt is received, the IS timer 56 is disabled without expiring, and the ignition sense controller 50 enters the ISON_PON state.

If the IS timer 56 expires, the CALLSTAT flag 25 is checked. If the CALLSTAT flat is not IDLE, the IS timer 56 is reinitialized to twenty seconds and the ignition sense controller 50 remains in the IS_TO state. If the CALLSTAT flag 25 is IDLE, the ignition sense controller 50 instructs the phone 80 to power down, such as by sending a PHONESTATUS(OFF) request to the phone 80 via the interface port 28, and the ignition sense controller 50 goes to the WAIT state. The instructing of the phone 80 to power down is the start of an "automatic" power down.

Figure 8:
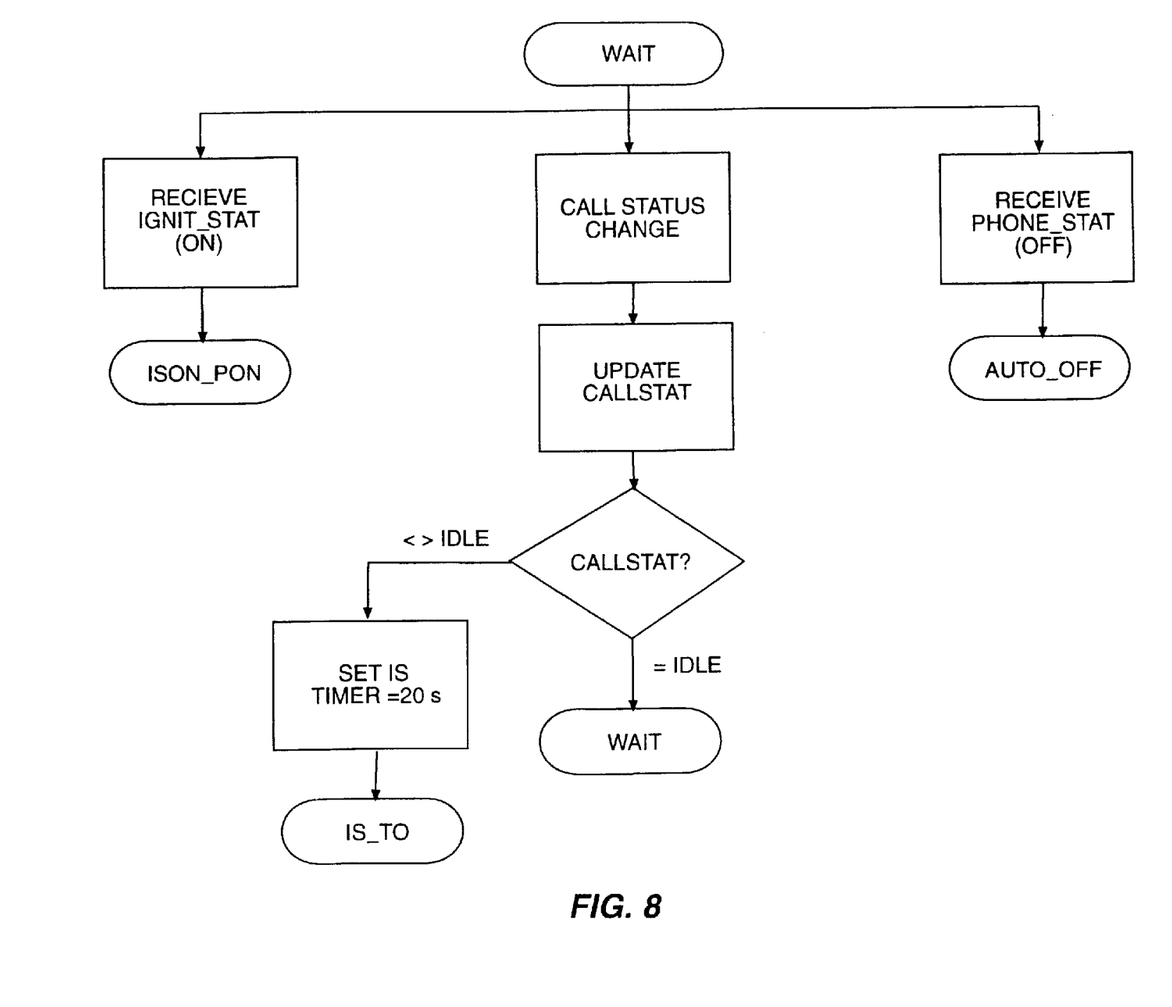
FIG. 8 is an simplified flow diagram of the WAIT state.

In the WAIT state, which is shown in more detail in FIG. 8, the ignition 14 is off and the phone 80 should be in the process of powering down. This state is essentially a wait state between the IS_TO state and the AUTO_OFF state. While in this state, if the IGNIT_STAT(ON) interrupt is received, the ignition sense controller 50 goes to the ISON_PON state. If call state change occurs, the updated CALLSTAT is checked; if IDLE, the ignition sense controller 50 remains in the WAIT state, if not IDLE, the IS timer 56 is reinitialized to twenty seconds and the ignition sense controller 50 reenters the IS_TO state. If the PHONE_STAT(OFF) interrupt is received, indicating a successful power down of the phone 80, the ignition sense controller 50 goes to the AUTO_OFF state. In this situation, the "automatic" power down of the phone 80 is complete upon receipt of the PHONE_STAT(OFF) interrupt.

Figure 9:
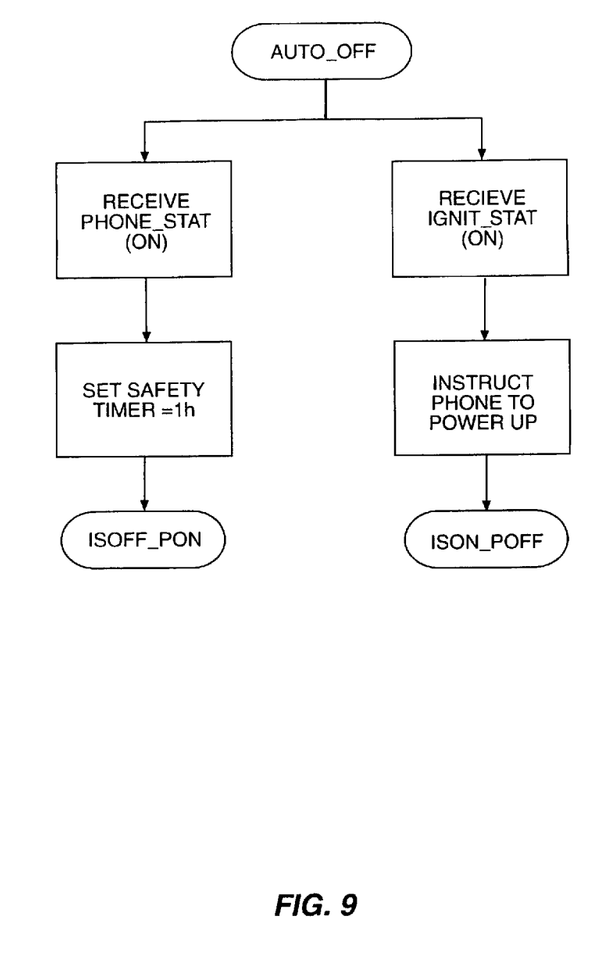
FIG. 9 is an simplified flow diagram of the AUTO_OFF state.

In the AUTO_OFF state, which is shown in more detail in FIG. 9, both the ignition 14 and the phone 80 are off. This state differs from the ISOFF_POFF state in that it can only be entered by the ignition sense controller 50 causing the phone 80 to turn off after the user turns off the ignition 14 (and the IS timer 56 expires). The primary purpose of this state is to allow the phone 80 to be automatically turned on when the vehicle ignition 14 is turned on. If, while in this state, the PHONE_STAT(ON) interrupt is received, indicating that the user has intervened to turn on the phone 80, the safety timer 54 is set to one hour and the ignition sense controller 50 enters the ISOFF_PON state. If, instead, the IGNIT_STAT(ON) interrupt is received, the ignition sense controller 50 issues an instruction to the phone 80 to begin powering up, such as by sending a PHONESTATUS(ON) request to the phone 80 via the interface port 28, and the ignition sense controller 50 enters the ISON_POFF state.

In the AUTO_OFF mode and the ISOFF_POFF states, the power management circuit 40 should be in the sleep mode, thereby reducing the power drain of the communications accessory 20 to less than one milliamp. In the other modes, the power management circuit 40 should be in the active mode.

Overall, the safety timer 54 is used to ensure that the phone 80 is powered off by at least a specified time after the ignition 14 is turned off. The install timer 52 and the VISS flag 23 interact to verify that the ignition sense line 74 is properly installed. The IS timer 56 allows a short waiting period to run after the ignition 14 is turned off before instructing the phone 80 to begin powering down. The particular time periods used for these timers 52,54,56 in the description above are merely preferred settings and do not represent limitations; instead, a wide variety of timer periods are possible as a matter of design choice.

The ignition sense controller 50 represents one approach for updating various status flags for use by other processes of the communications accessory 20. In addition, the ignition sense controller logic described above performs several unique functions. First, the scheme changes the response of the communications accessory 20 to the ignition 14 being turned on so as to depend not only on the state of the ignition 14, but also on the history of the phone 80. That is, the scheme will automatically turn off an idle phone 80 after a short period of time (upon expiration of the IS timer 56) once the ignition 14 is turned off. Further, the scheme will automatically instruct the phone 80 to power on in response to the ignition 14 being turned on, when the scheme is responsible for earlier turning off the phone 80. However, in contrast to the prior art, the scheme will not instruct the phone 80 to power on when the ignition 14 is turned on in the special case of the user having previously intervened to turn off the phone 80. For ease of reference, this feature is called the user priority feature.

Second, the scheme allows for the propriety of the ignition sense line 74 installation to be checked. If not installed, then the VISS flag 23 will remain at NOT_INSTALLED, and the only available states will be ISOFF_POFF and ISOFF_PON. If installed incorrectly, the VISS flag 23 will be set to INSTALLED_ERR when the install timer 52 expires. This normally indicates that the ignition sense line 74 is installed to a non-switched line and is therefore incorrectly installed. There is a slight possibility that the install timer 52 may expire even when the ignition sense line 74 is properly installed, such as when the vehicle 10 is a long-haul truck that operates for more than twelve hours continuously, but this is not believed likely and is handled by resetting the VISS flag 23 to INSTALLED_OK before entering the ISOFF_POFF or IS_TO states. If the ignition sense line 74 is improperly installed, the only available states are ISOFF_POFF, ISOFF_PON, ISON_POFF, and ISON_PON. Once the install timer 52 expires, the only available states are ISOFF_POFF and ISOFF_PON. For ease of reference, this feature is called the installation check feature.

Third, the scheme allows for a safety timer 54 to be intelligently set and reset when it is readily apparent that the user is interacting with the phone 80. For ease of reference, this feature is called the intelligent safety feature.

While the embodiment described above has the user priority feature, the installation check feature, and the intelligent safety feature, this is not required. Instead, any one of these features may be present while the others are optional. Thus, some embodiments may have the user priority feature only, while others may have the user priority feature and the installation check feature but not the intelligent safety; and still others may have the installation check feature and the intelligent safety, but not the user priority feature, etc.

Thus, with the present invention, the power management of a communications accessory may be set not only in regards to the state of the vehicle ignition 14, but also to the history of the wireless communications device 80 attached to the communications accessory 20. Such a power management scheme allows the phone 80 to be automatically instructed to power on by the communications accessory 20 when the communications accessory 20 is the cause of the phone 80 being powered off. If instead, the user powers off the phone 80, the communications accessory 20 will not turn on the phone 80 without user intervention.

Separately or combined therewith, the power management scheme may optionally include a method for determining whether the ignition sense line 74 has been correctly installed.

Finally, from the above description, it should be apparent that the safety timer 54 is used to prevent the phone 80 from draining the vehicle battery 12 if the phone 80 is for some reason left on in the vehicle for a long time, without having the ignition sense line 74 installed correctly. It should be noted that the safety timer 54, while preferred, is not required.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling the on/off state of a wireless communications device connected to a vehicle ignition system, comprising:
   a) monitoring the power state of said vehicle ignition system;
   b) automatically turning off said wireless communications device by supplying a control signal to said wireless communications device instructing said wireless communications device to turn off in response to said vehicle ignition system powering off, said supplying a control signal comprising waiting a predetermined time period after said vehicle ignition system powers off and delaying generating said control signal for an additional amount of time if said wireless communications device is active when said predetermined time period elapses; and
   c) thereafter, in response to said vehicle ignition system powering on:
      i) automatically turning on said wireless communications device if said wireless communications device was last turned off in response to said control signal;
      ii) leaving said wireless communications device turned off if said wireless communications device was last turned off by user action.

2. The method according to claim 1 wherein said delaying generating said control signal for an additional amount of time if said wireless communications device is active when said predetermined time period elapses comprises delaying delaying generating said control signal until the wireless communications device enters an idle state.

3. The method according to claim 1 further including periodically checking the status of the wireless communications device after the vehicle ignition system powers off and automatically turning off the wireless communications device when the wireless communications device enters an inactive state.

4. The method of claim 1 wherein said wireless communications device is selected from the group consisting of cellular telephones, personal digital assistants, and satellite cellular telephones.

5. The method of claim 1 further including electrically connecting said wireless communications device to a communications accessory, and wherein said communications accessory automatically performs said supplying said control signal in response to said vehicle ignition system powering off.

6. A method of controlling the on/off state of a wireless communications device connected to a vehicle in response to the vehicle's ignition system powering on, said wireless communications device being turned off when the vehicle ignition system powers on, said wireless communications device having a plurality of active call states including an idle call state, said method comprising:
   a) turning on said wireless communications device;
   b) turning on said vehicle's ignition, and thereafter turning off said ignition and starting a first timer;
   c) automatically instructing said wireless communications device to turn off if said first timer expires and said wireless communications device is in said idle call state;
   d) thereafter, determining whether said wireless communications device was last turned off by user action;
   e) thereafter, based on said determination:
      i) automatically turning on said wireless communications device if the wireless communications device was last turned off automatically in response to the vehicle's ignition being powering off, said automatically turning on including supplying a control signal to said wireless communications device instructing said wireless communications device to turn on; and
      ii) leaving said wireless communications device in said turned off state if the wireless communications device was last turned off by user action.

7. A method of controlling the on/off state of a wireless communications device connected to a vehicle in response to the vehicle's ignition system powering on, said wireless communications device being turned off when the vehicle ignition system powers on, said wireless communications device connected to the vehicle by a communications accessory having a sleep mode and an active mode, said method comprising:
   a) powering on the vehicle's ignition system, turning on said wireless communications device, and operating said communications accessory in said active mode, and thereafter powering off said ignition system while said wireless communications device is turned on and starting a first timer in response thereto; and thereafter either:
      i) turning off said wireless communications device in response to user action before said first timer expires, and in response thereto, disabling said first timer without expiration thereof and putting said communications accessory in said sleep mode; or
      ii) powering on said ignition system and disabling said first timer without expiration thereof in response thereto; or
      iii) in response to the expiration of said first timer, said communications accessory automatically instructing said wireless communications device to turn off;
   b) thereafter, determining whether said wireless communications device was last turned off by user action;
   c) thereafter, based on said determination:
      i) automatically turning on said wireless communications device if the wireless communications device was last turned off automatically in response to the vehicle's ignition being powering off, said automatically turning on including supplying a control signal to said wireless communications device instructing said wireless communications device to turn on; and
      ii) leaving said wireless communications device in said turned off state if the wireless communications device was last turned off by user action.

8. A method of controlling the on/off status of a wireless communications device connected to a vehicle based on the current ignition status of the vehicle and the history of the wireless communications device when the vehicle's ignition is powered on, comprising:
   a) connecting said wireless communications device to a communications accessory, said communications accessory being connected to said vehicle and monitoring the ignition status of said vehicle;
   b) turning on said wireless communications device;
   c) thereafter, turning off said ignition and setting a first timer;
   d) said communications accessory automatically instructing said wireless communications device to turn off in response to said timer expiring by supplying a control signal to said wireless communications device instructing said wireless communications device to turn off, said supplying a control signal comprising waiting a predetermined time period after said vehicle ignition system powers off and delaying generating said control signal for an additional amount of time if said wireless communications device is active when said predetermined time period elapses; and
   e) thereafter, turning on said ignition, and in response thereto said communications accessory automatically instructing said wireless communications device to turn on unless the last turning off of said wireless communications device was by user action.

9. A method of determining whether an ignition sense line is installed correctly between a communications accessory and a vehicle, said vehicle having an ignition variably operable between an on state and an off state, comprising:
   a) setting a status flag to a default indication that the ignition sense line is not installed;
   b) thereafter, detecting a first signal via said ignition sense line, and, in response thereto, setting a status flag to indicate a proper installation of said ignition sense line and setting a timer to a first time period;
   c) disabling said timer prior to expiration in response to the detection of a second signal via said ignition sense line; and
   d) setting said status flag to indicate an improper installation of said ignition sense line in response to said timer expiring.

10. The method of claim 9 wherein said first signal is indicative of said ignition entering said on state.

11. The method of claim 9 wherein said second signal is indicative of said ignition entering said off state.

12. The method of claim 9 wherein said communications accessory is a hands-free adapter.

13. An accessory connected to a vehicle ignition system for controlling the on/off state of a wireless communications device, said accessory comprising:
   a) an ignition sense circuit for detecting the power state of said vehicle ignition system; said ignition sense circuit including a first timer having an associated predetermined time period; and
   b) a power control logic connected to said ignition sense circuit and said wireless communications device for controlling the on/off state of said wireless communications device, said power control logic being operative to:

i) automatically turn off said wireless communications device after the vehicle ignition system is powered off by supplying a control signal instructing said wireless communications device to turn off after waiting at least said predetermined time period after said vehicle ignition system powers off, wherein said power control logic delays generating said control signal beyond the end of said predetermined time period if said wireless communications device is active when said predetermined time period elapses;

ii) automatically turn on said wireless communications device after the vehicle ignition system is powered on, by supplying a control signal to said wireless communications device instructing said wireless communications device to turn on, when the wireless communications device was last turned off automatically;

iii) leave said wireless communications device turned off after the vehicle ignition system is powered on when the wireless communications device is last turned off by user action.

14. The accessory of claim 13 wherein said wireless communications device is a cellular telephone.

15. The accessory of claim 13 further including an ignition sense line connected to the vehicle ignition system and operative to indicate state changes of said vehicle ignition system, and wherein said ignition sense circuit monitors said ignition sense line.

16. The accessory of claim 13 further including a charge circuit in communication with and selectively enabled by said power control logic, said charge circuit selectively operable to charge said wireless communications device.

17. The accessory of claim 13 wherein said accessory is a hands-free adapter.

* * * * *